United States Patent
Kropp

(10) Patent No.: US 7,761,227 B2
(45) Date of Patent: Jul. 20, 2010

(54) ROUTE DETERMINATION AND DRIVER WARNING SYSTEM

(75) Inventor: Michaela Kropp, Hildrizhausen (DE)

(73) Assignee: Harman Becker Automotive Systems GmbH, Karlsruhe (DE)

( * ) Notice: Subject to any disclaimer, the term of this patent is extended or adjusted under 35 U.S.C. 154(b) by 487 days.

(21) Appl. No.: 11/683,404

(22) Filed: Mar. 7, 2007

(65) Prior Publication Data

US 2007/0225900 A1 Sep. 27, 2007

(30) Foreign Application Priority Data

Mar. 8, 2006 (EP) .................................. 06004719

(51) Int. Cl.
*G01C 21/00* (2006.01)
(52) U.S. Cl. .................. 701/202; 701/209; 340/995.23
(58) Field of Classification Search ................. 701/202, 701/209; 340/995.23
See application file for complete search history.

(56) References Cited

U.S. PATENT DOCUMENTS

| | | | | |
|---|---|---|---|---|
| 5,978,733 A | * | 11/1999 | Deshimaru et al. ........... | 701/209 |
| 6,298,303 B1 | * | 10/2001 | Khavakh et al. ............. | 701/209 |
| 6,678,611 B2 | * | 1/2004 | Khavakh et al. ............. | 701/210 |
| 6,898,519 B1 | | 5/2005 | Schilling ..................... | 701/208 |
| 2004/0201495 A1 | * | 10/2004 | Lim et al. ................... | 340/905 |
| 2006/0015249 A1 | * | 1/2006 | Gieseke ....................... | 701/210 |

FOREIGN PATENT DOCUMENTS

| | | |
|---|---|---|
| EP | 1186862 | 3/2002 |
| JP | 2002236027 | 8/2002 |
| JP | 2004198368 | 7/2004 |
| WO | WO 2005/031266 A1 | 4/2005 |

OTHER PUBLICATIONS

S. K. Datla, R. S. Moorthy and K. V. Krishna Rao; A GIS for Routing of Oversized and Hazardous Material Carrying Vehicles; MAP Asia 2004 Conference 2004; pp. 1-12.

* cited by examiner

*Primary Examiner*—Mark Hellner
(74) *Attorney, Agent, or Firm*—The Eclipse Group LLP

(57) ABSTRACT

A system for determining a route and for warning a driver of a vehicle and corresponding methods are provided. The systems include storage units that store road segment passage restriction data and vehicle passage restriction data. The systems further include a working memory unit and a processing unit that determine a route to be displayed on an output unit or that provide a warning signal output, depending upon both the vehicle passage restriction data and the road segment passage restriction data.

28 Claims, 8 Drawing Sheets

ROUTE DETERMINATION AND DRIVER WARNING SYSTEM

RELATED APPLICATIONS

This application claims priority of European Patent Application Serial No. 06 004 719.8, filed Mar. 8, 2006, titled METHOD AND SYSTEM FOR DETERMINING A ROUTE AND FOR WARNING A DRIVER; which application is incorporated by reference in this application in its entirety.

BACKGROUND OF THE INVENTION

1. Field of the Invention

This invention relates to a method and system for route determination and a method and system for warning a driver of a vehicle of potential problems along a route.

2. Related Art

Navigation devices function to find optimal driving routes. Frequently, specific user-defined preferences are used in determining an optimal driving route. Such preferences can include finding the shortest or fastest route or avoiding ferries or highways. Identifying a fastest route is typically based upon road segment data, such as road segment length and speed limits for various types of road segments. Other parameters, are often not considered, such as the characteristic travel speed of the user's particular vehicle type, whether it be a car, bus, truck or some other vehicle.

Further, additional parameters, such as road restrictions can be of great importance in determining an optimal route. Such road restrictions may be relevant to all vehicles or only to certain vehicle types. For example, one-way restrictions impose the same limitations for all vehicles and these can be routinely taken into account in route determination by navigation devices. Other road passage restrictions may be applicable only to certain vehicles and these are not routinely considered by navigation devices. Such road passage restrictions can include, vertical clearance, horizontal clearance, roadway curvature radius, lane width and weight restriction of a road segment.

Moreover, parameters related to user preference, vehicle limitations or road passage restrictions can in some instance lie outside a range that might be considered ideal, thus creating potential problems for travel along a given route. Nevertheless, currently available navigation devices do not warn the user of these potential problems.

Thus, there is a need for improved methods and systems for route determination and for warning a driver of potential problems along the determined route.

SUMMARY

In one example of an implementation, a method is provided for determining a route for a vehicle from a start point to a destination. The method includes (i) providing road segment passage restriction information for a plurality of road segments; (ii) providing vehicle passage restriction data characterizing the vehicle; and (iii) determining a route from the start point to the destination for the vehicle based upon both the vehicle passage restriction data and the road segment passage restriction information.

In another implementation, a route determination system is also provided that includes (i) a first storage unit containing road segment passage restriction information; (ii) a second storage unit containing vehicle passage restriction data characterizing the vehicle; (iii) a working memory unit for storing a subset of the road segment passage restriction information and the vehicle passage restriction data; and (iv) a processing unit coupled to the working memory unit. The processing unit is adapted to determine a route from a start point to a destination based upon both the road segment passage restriction information and the vehicle passage restriction data.

Alternatively, the route determination system may include (i) a first storage unit having stored thereon a first and second passage threshold value for a road segment; (ii) a second storage unit storing a vehicle parameter; and (iii) a processing unit that compares the vehicle parameter to both the first and the second passage threshold value for the road segment and determines a route based on a result of the comparison.

In another example of an implementation, a method is provided for warning a driver of a vehicle of potential problems along a route. The method includes (i) providing road segment passage restriction information for a road segment; (ii) providing vehicle passage restriction data characterizing the vehicle; (iii) comparing the vehicle passage restriction data with the passage restriction information of the road segment; and (iv) outputting a warning signal, depending upon the result of the comparison.

In another implementation, an example of a system for warning a driver of a vehicle is also provided. The system includes (i) a first storage unit that contains road segment passage restriction information; (ii) a second storage unit that contains vehicle passage restriction data characterizing the vehicle; (iii) a working memory unit for storing the road segment passage restriction information of at least one road segment and the vehicle passage restriction data; (iv) a processing unit coupled to the working memory unit from which the processing unit receives and compares passage restriction information of the road segment and vehicle passage restriction data; and (v) an output unit coupled to the processing unit to receive a control signal from the processing unit. The output unit is adapted to produce a warning signal based upon the control signal.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

FIGS. 1-8 illustrate various implementations of methods and systems for determining a route based upon vehicle and road-segment characteristics. Such systems and methods may also provide a warning to a driver when potential problems are indicated from vehicle and road-segment characteristics. The vehicle characteristics considered are those related to vehicle passage restrictions or limitations including, but not limited to vehicle height, vehicle width, vehicle turning circle radius and vehicle weight. Road-segment characteristics considered are those characteristics related to road segment passage restrictions or limitations including, but not limited to vertical clearance, horizontal clearance, lane width, curvature radius, and weight restrictions of a road segment.

Figure 1:
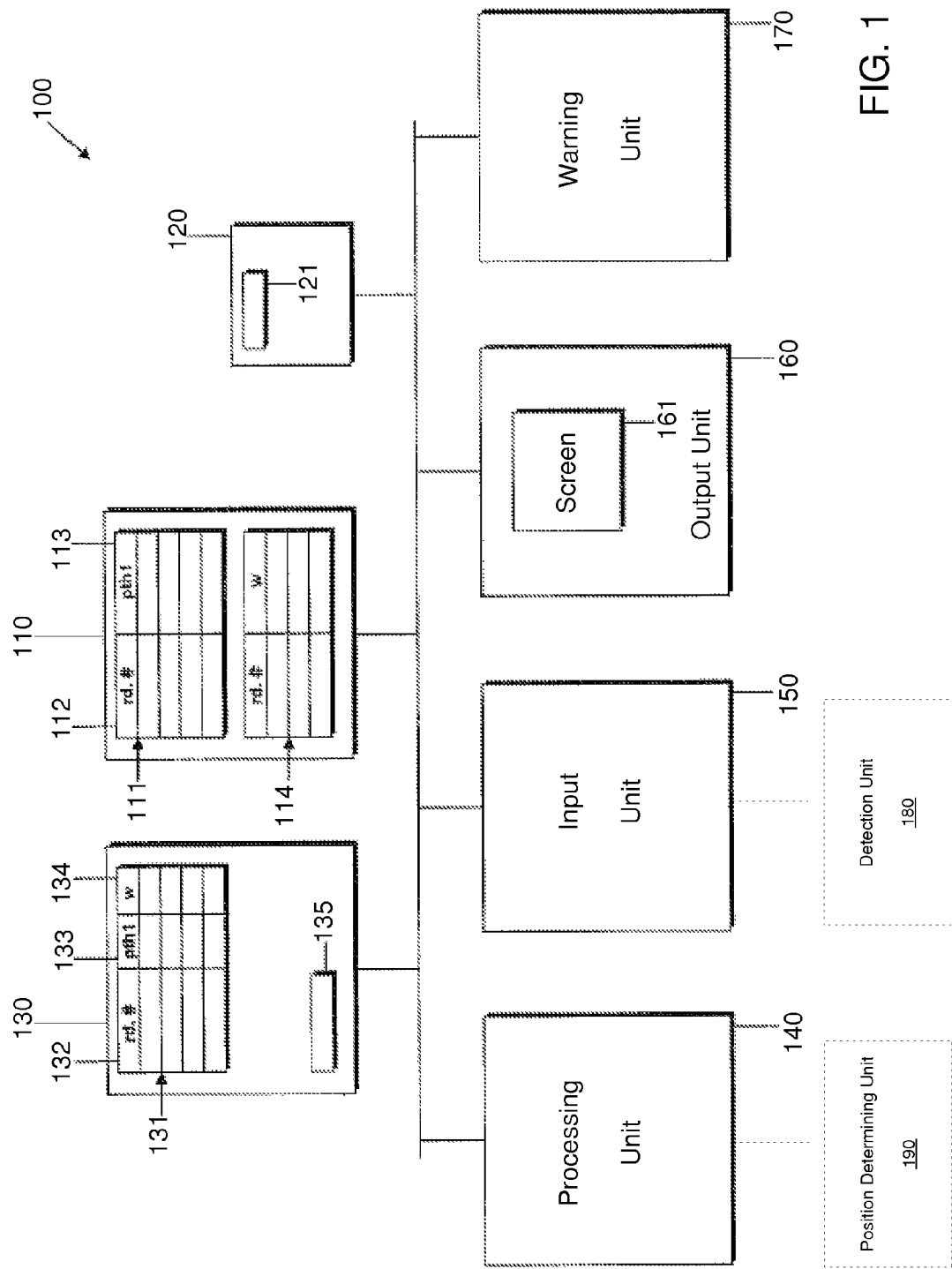
FIG. 1 is a schematic block diagram of an example system for determining a route and for warning a driver according to an implementation.

FIG. 1 illustrates a block diagram of an implementation of an example system 100 that may determine a route and warn a driver of possible problems in road segments along the route. The system in FIG. 1 includes a road segment data storage unit 110 that is typically a CD-ROM or a DVD, an additional vehicle passage restriction data storage unit 120 and a working memory unit 130. Further, the system includes a processing unit 140, an input unit 150, an output unit 160, and a warning unit 170. The storage unit 110 contains road segment passage restriction information and road segment weighting factors, both of which typically have the form of data arrays 111 and 114, respectively. The data may be organized such that road segments are labelled, for example, using increasing numbers. The road segment passage restriction information is then stored in the storage unit 110 in a manner such that each road segment is linked to passage restriction information for that segment. This is illustrated in FIG. 1. as a table having two columns, 112 and 113 in which the first column identifies a road segment and the second column contains the passage restriction information for that road segment. In the example illustrated in FIG. 1, the passage restriction information 113 for each road segment is shown as a single numerical value, the first passage threshold value pth1. This passage threshold value pth1 represents a value that may not be exceeded by a vehicle traversing the road segment. For example, the first passage threshold value pth1 may correspond to a vertical clearance of a road segment, as illustrated schematically in FIG. 8. In various implementations, more than one type of passage restriction information may be linked to each road segment such as, for example, vertical clearance restrictions and roadway width or lane width restrictions or one or more other roadway passage restrictions.

In a second data array 114 in storage unit 110, road segment weighting factors (w) are stored on the storage unit 110 in a second data array 114 that is organized such that each road segment (rd #) is associated with a corresponding weighting factor.

An additional storage unit 120 contains vehicle passage restriction data 121. The vehicle passage restriction data 121 characterizes the vehicle. Such data may represent any one or more of vehicle height, vehicle width, either or both of vehicle axle base and number of axles, vehicle length, vehicle turning circle radius, vehicle weight or any other vehicle passage restriction characteristic. The vehicle passage restriction data 121 may be in the form of a single numerical value or of an array of numbers representing multiple characteristics. The additional storage unit 120 may be an internal hard disk of a navigation device or, if the navigation device is not equipped with a hard disk, may be identical to the working memory unit 130 or may be stored with the data on the data storage unit 110.

In the working memory unit 130, data is stored for further processing. In particular, the working memory unit 130 contains road segment passage restriction information (pth1) and road segment weighting factors (w) for a subset of road segments, for example, in the form of a data array 131 in which the road segment number (rd. #) is linked to the road segment passage restriction information (pth1) and the segment weighting factor (w). This is illustrated in FIG. 1 as a table having three columns 132, 133 and 134 which correspond to the road segment number (rd. #), the corresponding passage restriction information (pht1), and the corresponding weighting factor (w), respectively. Further, a copy of the vehicle passage restriction data 135 may also be stored in the working memory unit 130. The processing unit 140 is adapted to perform mathematical operations on data stored in the working memory unit 130. In particular, the processing unit 140 is adapted to compare numerical values stored in the working memory unit 130 or to update such numerical values. Further, the processing unit 140 is coupled to and adapted to provide signals to the output unit 160 and the warning unit 170. As illustrated in the example shown in FIG. 1, the output unit 160 may include a screen 161, or other mechanism for communicating information to a user. The input unit 150 is provided for entering vehicle passage restriction data and/or other data relevant to route determination.

FIG. 1 thus illustrates a system that determines a route for a vehicle based upon a first storage unit 110 that contains road segment passage restriction information, a second storage unit 120 that contains vehicle passage restriction data characterizing the vehicle, a working memory unit 130 for storing a subset of the road segment passage restriction information (pth1) and the vehicle passage restriction data 135, and a processing unit 140 that is coupled to the working memory unit 130 and adapted to determine a route based on both the road segment passage restriction information (pth1) and the vehicle passage restriction data 135. The passage restriction data (pth1) is relevant to a specific vehicle and the road segment passage restriction information 135 is relevant to the passage restriction data of that vehicle.

The first storage unit 110 that contains the road segment data, may be a replaceable storage unit, such as, for example a CD-ROM, a DVD, a hard disk or a storage card, such as an SD-card. The second storage unit 120 that contains vehicle passage restriction data 121, may be a hard disk storage unit or it may be a working data storage unit such as that utilized in working memory unit 130 or it may be incorporated into the working memory unit 130. Further, the first and the second storage units 110, 120 need not be separate storage units, i.e., the first and second storage units may be integrated into one single unit such as the hard disk. Moreover, the first storage unit 110 may also be external to the vehicle, road segment passage restriction information being transmitted to other components of the system, for example by radio waves, or other mechanism for communicating information to a vehicle.

The processing unit 140 may be adapted to determine first and second passage threshold values based upon the passage restriction information (pth1) of road segments. Thus, the first and second passage threshold values may be determined and the corresponding data may be stored in the working memory unit 130 for further processing.

Further, the system may include a storage unit 114 containing road segment weighting factors (w). The storage unit 114 may be part of the first storage unit 110 as shown in FIG. 1, or it may be a separate, third storage unit (not shown) that is the same type of storage unit as the first storage unit 110 or a different type of storage unit of the group of storage units described above for the first storage unit 110. The provision of road segment weighting factors (w) may be particularly important in systems in which the determination of a route is based upon the computation of a cost function. In implementations including such weighting factors, the working memory unit 130 may be further adapted to store the road segment weighting factors (w) in column 134 of the data array 131 and the processing unit 140 may be adapted to adjust the weighting factors 134 stored in the working memory unit depending upon a comparison of the vehicle passage restriction data 121, 135 with the road segment passage restriction information (pth1). In such implementations, the processing unit 140 may be subsequently utilized to determine a route based upon the adjusted weighting factors stored in the working memory unit 130.

The system 100 also includes an input unit 150 by which a user may enter vehicle passage restriction data 121, 135 such as, for example, vehicle height, vehicle length, vehicle weight or any other vehicle passage restriction data. This data may then be transferred to storage unit 120 where the vehicle passage restriction data 121 is then stored.

In another example of an implementation, the system 100 may further include a detection unit 180 for automatically determining the vehicle passage restriction data 121, and a unit such as the input unit 150 shown in FIG. 1, for receiving the vehicle passage restriction data 121 from the detection unit 180 and for transferring the data to the second storage unit 120. In this way, the vehicle passage restriction data 121 may be determined automatically, thus making the system 100 more convenient for the user. In one example of an implementation, the detection unit 180 may include a unit for automatically determining a vehicle length, such as, for example, by determining whether a trailer is coupled to the vehicle. Further, the detection unit 180 may additionally or alternatively include a unit for automatically determining a vehicle height using, for example, laser interferometry. Moreover, the detection unit 180 may additionally or alternatively include a unit for automatically determining a vehicle weight such as would be measured by a scale over which the vehicle passes and transmitted via radio waves to the system 100.

The system 100 shown in FIG. 1 may also function both to determine a route and to warn a driver when there are potential problems on a road segment along the route. As described above and shown in FIG. 1, the system 100 that performs both these functions may include a first storage unit 110 containing road segment passage restriction information 111, a second storage unit 120 containing vehicle passage restriction data 121 characterizing the vehicle, a working memory unit 130 for storing road segment passage restriction information (pth1) of at least one road segment (rd. #) and the vehicle passage restriction data 135, a processing unit 140 coupled to the working memory unit 130 adapted to compare the passage restriction information (pth1) of the road segment (rd. #) with the vehicle passage restriction data 121, 135, and an output unit 160 coupled to the processing unit 140 to receive a control signal from the processing unit 140 and adapted to output a warning signal via the warning unit 170 based on the control signal. The first and second storage units 110, 120 and the working memory unit 130 of the system 100 for warning a driver perform similar functions in determining a route as described above and in warning the driver. For the system to function to warn a driver, however, the processing unit 140 may be further adapted to output a control signal to an output unit 160 or warning unit 170 which, in turn, may be adapted to output a warning signal based upon the control signal. Thus, the system 100, illustrated in FIG. 1, may provide for a warning signal to be output depending upon the result of a comparison in the processing unit 140, of the road segment passage restriction information (pth1) with the vehicle passage restriction data 121, 135.

The system may further include a position determining unit 190 that determines a current vehicle position and provides that vehicle position information to the processing unit 140. In this way, the processing unit 140 may determine the active road segment on which the vehicle is currently located or the active road segment which the vehicle is approaching. The processing unit 140 may then determine whether a warning signal is to be output for the active road segment.

In an example of another implementation, the processing unit 140 may be further adapted to determine first and second passage threshold values of the road segment based on the passage restriction information (pth1), and to output a first or second control signal based upon the result of the comparison of the vehicle passage restriction data 121, 135 with the first and second passage threshold values, respectively. The output or warning unit 160, 170 may then be adapted to output a first or second warning signal in response to receiving the first or second control signal, respectively. In this way, different warning signals may be output depending on whether the vehicle should not proceed to traverse the road segment due to a passage restriction, or whether the vehicle may proceed, but with extra caution being exercised due to a limited safety margin along the road segment. The output unit may include some signalling component such as an optical device such as a light-emitting diode or liquid-crystal display screen or an acoustical device such as a loudspeaker. The output or warning unit 160, 170 may, however, also be separate from the navigation device. For example, the output or warning unit 160, 170 may be included in an instrument cluster interfacing the navigation device and adapted to receive control signals from the navigation device.

To determine a route for a specific vehicle, in the system of FIG. 1, the vehicle height or other relevant passage restriction data may be entered using the input unit 150 and stored in the storage unit 110, 120 or 130. As set forth above, this information may further be detected by the system 100 or may be pre-recorded on a storage unit 110, 120, 130.

Figure 2:
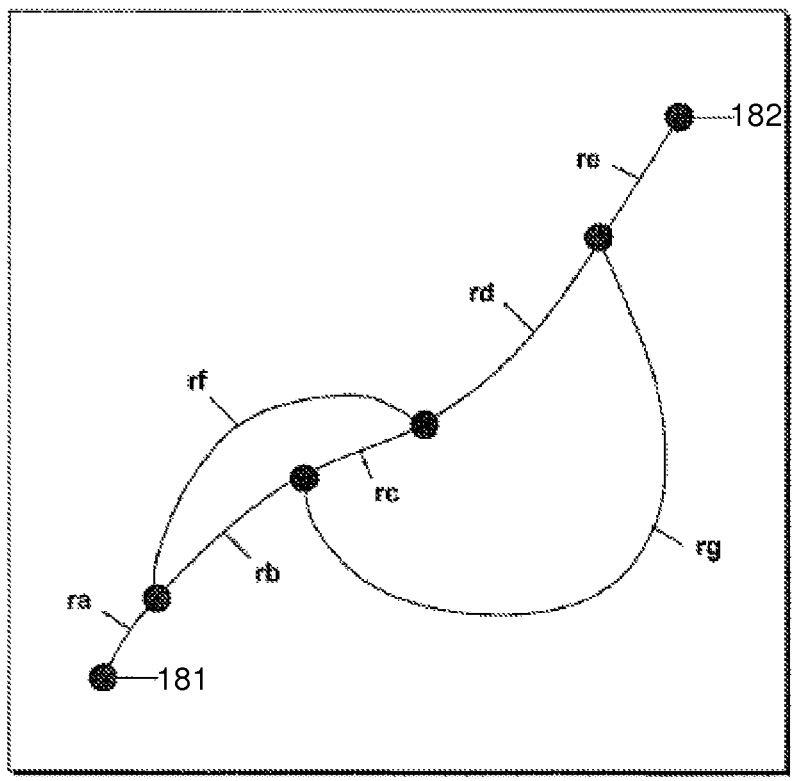
FIG. 2 is a schematic illustration of an example of a set of road segments in which alternate routes from the start point to the destination may be selected based upon vehicle and road segment restrictions.

FIG. 2 provides an example of a how a particular route is formulated by the system in FIG. 1. FIG. 2 shows a set of road segments ra-rg, linked by road segment vertices indicated by full circles. For illustration purposes, it will be assumed that a shortest route is to be determined. In this case, the road segment weighting factors (w) correspond to the respective road segment length. Further, it will be assumed, for illustration purposes, that the road segments rc and rf have a finite vertical clearance, whereas all other road segments do not have a vehicle height passage restriction. It is to be understood that vehicle height passage restrictions are described for illustrative purposes only, and the systems and methods described may determine a route or generate a driver warning based upon any one or more road segment passage restrictions and vehicle passage restrictions. In the example shown in FIG. 2, the assumption is further made by way of illustration, that the vertical clearance of the road segment rc is lower than the one of the road segment rf, so that an optimum route from a start point 181 to a destination 182 will be different for vehicles having different heights. Thus, for a vehicle having a vehicle height lower than the vertical clearance of the road segment rc, the optimum route will traverse road segments ra, rb, rc, rd and re. For a vehicle having a height higher than the vertical clearance of the road segment rc but lower than the vertical clearance of the road segment rf, a shortest route will traverse road segments ra, rf, rd and re. Finally, for a vehicle having a vertical height higher than the vertical clearance of the road segment rf, a shortest route will traverse the road segments ra, rb, rg and re.

Figure 3:
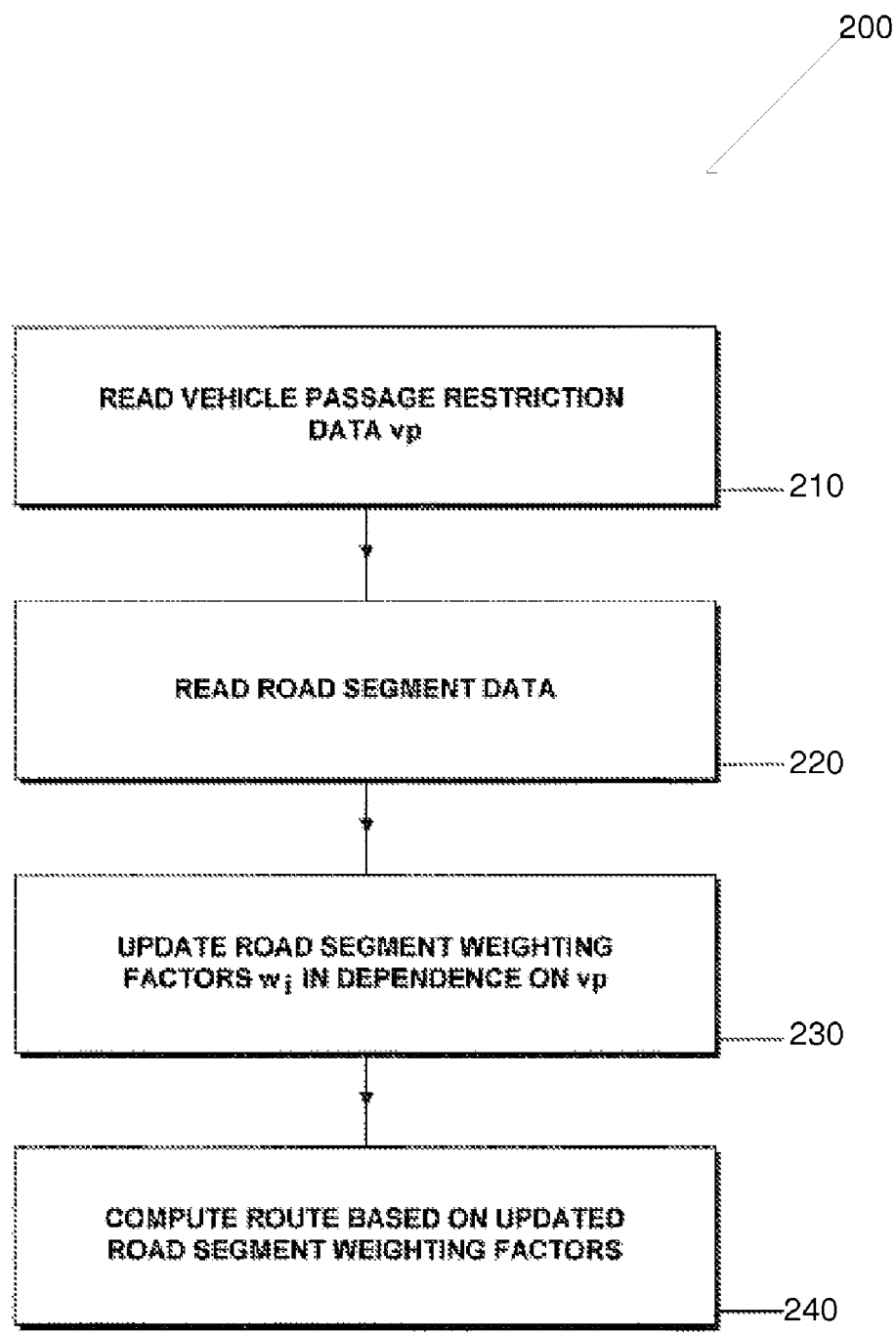
FIG. 3 is a flowchart representing an example method for determining a route according to one implementation.
Figure 4:
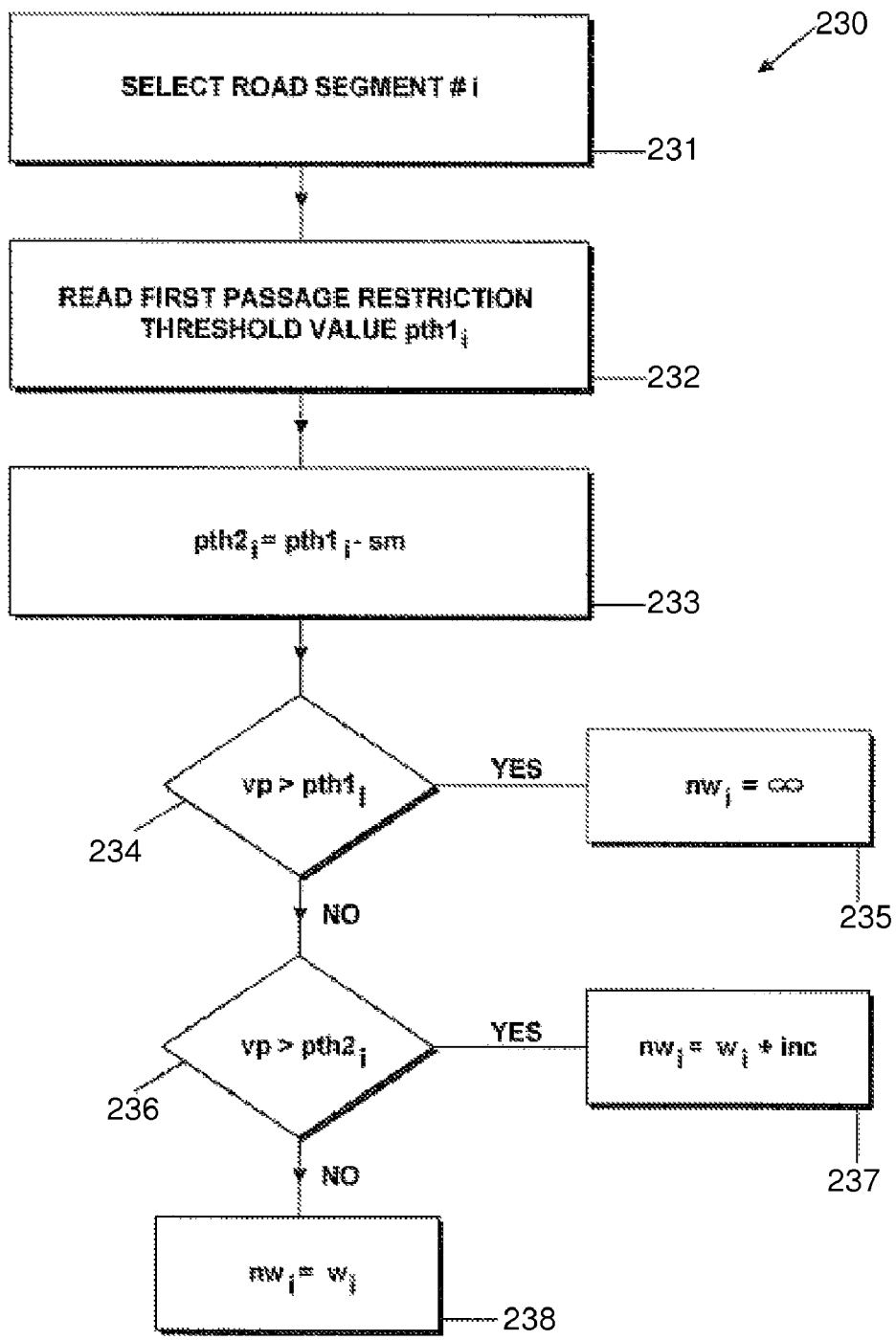
FIG. 4 is a flowchart representing an example of a subroutine of the method set forth in FIG. 3.
Figure 8:
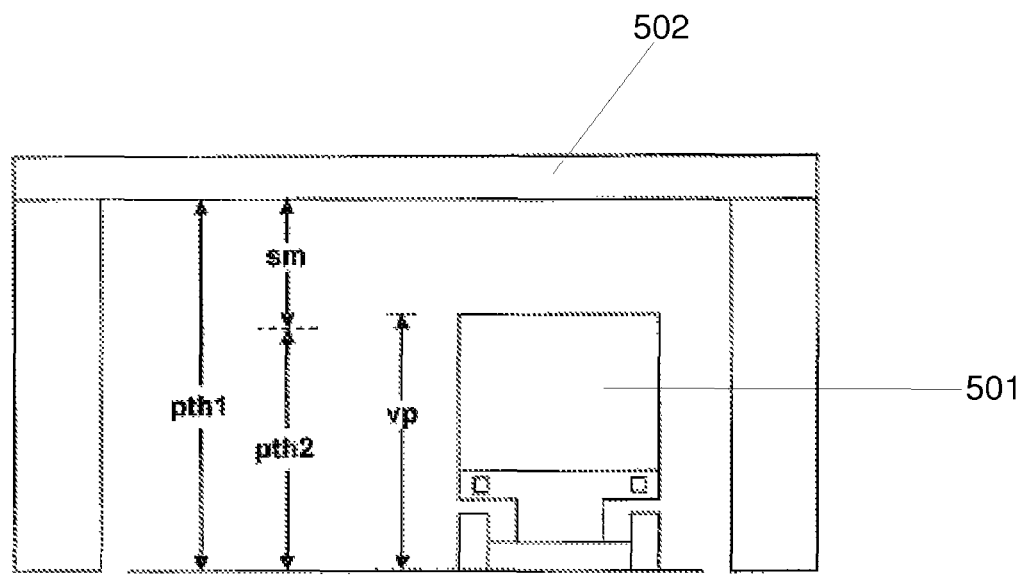
FIG. 8 illustrates an example of a vehicle having a height restriction and a road-segment vertical clearance structure having a clearance restriction in which a possible passage restriction threshold and safety margin are determined.

FIGS. 3 and 4 are flowcharts representing an example of an implementation of a method that may be utilized in connection with the system of FIG. 1 in determining a route. As discussed above in connection with FIG. 1, the vehicle height or other relevant passage restriction data may be entered using the input unit 150 shown in FIG. 1 and this data may be stored in the storage unit 120 also shown in FIG. 1. Subsequently, the following steps may be performed, as illustrated in FIG. 3. First, at step 210 of FIG. 3, the vehicle passage restriction data 121, vp, is read from the additional storage unit 120 shown in FIG. 1 and stored in the working memory unit 130 also shown in FIG. 1. By way of further illustration, the vp may correspond to vehicle height as shown in FIG. 8, which schematically illustrates a vehicle and a roadway clearance structure.

Subsequently, at step 220 of FIG. 3, road segment data that is relevant for the determination of the route is read from the storage unit 120 as shown in FIG. 1 and stored in the working memory unit 130 as also shown in FIG. 1. The data read from storage unit 120 may include road segment weighting factors (w) and road segment passage restriction information (pth1) for at least a subset of road segments. The road segment data will realistically include only a subset of road segment data taken from complete network of roadways of a given country such as a European country or the U.S. Thus, the complete set of road segment data is typically not read into the working memory unit 130. Instead, a subset of road segments is selected. Further, this selection may, in some but not all implementations, be based upon a hierarchy of roadways from highways that may be selected preferentially down to regional or local roadways.

In an alternative implementation, road segment passage restriction information (pth1) may be compared with vehicle passage restriction data 121 at step 220. Based upon the result of this comparison, the road segment data of specific road segments may not be included in the data stored in the working memory unit 130, for example, if the road segment passage restriction information (pth1) prohibits the vehicle from traversing the road segment. Using vehicle passage restriction data 121 and road segment data, a route could be computed based on minimization of a cost function using a sum of weighting factors of road segments traversed. This step, indicated at 240, would typically be carried out using any of a number of well-known algorithms. However, as shown in the implementation in FIG. 3, an additional step 230 may update the road segment weighting sectors, $w_i$, of the road segments, "i", stored in the working memory unit 130 of FIG. 1. This updating is based upon the vehicle passage restriction data 121, 135, vp, and the road segment passage restriction information (pth1) of these road segments. Once the weighting factors, $w_i$, of the road segments stored in the working memory unit 130 of FIG. 1 have been updated according to the method described in more detail below, the route may be determined using standard methods, such as minimization of a cost function employing an A* algorithm or Dijktra's algorithm, but based on the road segment weighting factors (w) that have been updated in dependence on the vehicle passage restriction data 121, 135 and the road segment passage restriction information (pth1).

FIG. 4 illustrates an example of an implementation of step 230 of updating road segment weighting factors (w) in greater detail. Referring to FIG. 4, in step 231, a road segment (rd. #) having a number represented by "i", is selected. Although not shown in this figure, the method beginning at step 231 is typically repeated as a subroutine for each of the road segments stored in the working memory unit 130 of the system shown in FIG. 1. Next, at step 232 of FIG. 4, the first passage restriction threshold value $pth1_i$ that corresponds to the road segment passage restriction information for road segment "i", is identified in the data stored in the working memory unit 130. At step 233, the second passage restriction threshold value $pth2_i$ of the road segment is computed by subtracting a safety margin, sm, from the first passage restriction threshold value.

For purposes of the example, FIG. 8 may be utilized to illustrate the first road segment passage restriction threshold value, $pth1_i$, the second road segment passage restriction threshold value, $pth2_i$, and the safety margin, sm. In the example shown in FIG. 8, the first and second passage restriction values are vertical height restrictions. Further, as also illustrated in FIG. 8, vehicle, 501, has a vehicle height restriction, vp, and the road segment has a vertical clearance structure, 502, that physically establishes the first road segment passage restriction threshold value, $pth1_i$, as a vertical height restriction. The safety margin, sm, represents an interval that establishes the second passage restriction threshold value, $pth2_i$, through which the vehicle may pass. This second passage restriction threshold value, $pth2_i$, is the difference between the first passage restriction threshold, $pth1_i$, and the safety margin, sm. As illustrated in the example in FIG. 8, the vehicle height restriction, vp, exceeds the second passage restriction threshold value $pth2_i$, and as a result, extra caution may need to be exercised by the driver as the vehicle traverses this road segment.

The safety margin may be determined in a variety of ways. In one implementation, the safety margin, sm, may have a fixed numerical value. In another implementation, the safety margin, sm, may be defined by a value input by a user and stored in a memory unit or a storage unit of the navigation device. In yet another implementation, the safety margin may be computed based upon the vehicle passage restriction data, e.g., as sm=0,1·vp. Alternatively, rather than computing the second vehicle passage restriction threshold value at step 233, both the first and the second passage restriction threshold values may be included in the road segment passage restriction information, such that both of these values are read directly from the storage unit 110 of the system shown in FIG. 1.

As further shown in FIG. 4, once both the first and the second passage restriction passage values have been determined, at step 234, the vehicle passage restriction data, vp, is compared with the first passage restriction threshold value. If the vehicle passage restriction data, such as for example, the vehicle height, exceeds the first passage restriction threshold value such as for example, the vertical clearance of the road segment, at step 235, the road segment weighting factor, $w_i$, is set to a new updated value, $nw_i$, which is infinity or another large value. If the vehicle passage restriction data 121, 135 does not exceed the first passage restriction threshold value, next, at step 236, the vehicle passage restriction data 121, 135, vp, is compared with the second passage restriction threshold value $pth2_i$. If the vehicle passage restriction data, 121, 135, vp, is included within the interval defined by the first and the second passage restriction threshold values, at step 237, the weighting factor $w_i$ is updated to a new weighting factor, $nw_i$, that is given by the original weighting factor, $w_i$, plus an increment, "inc". In one implementation, the increment, "inc", may be a fixed value. In another implementation, the increment, "inc", may be input by a user. The updated weighting factor $nw_i$ may also be computed multiplicatively rather than additively, i.e., by multiplying the original weighting factor $w_i$ by a number that is larger than 1. If the road segment passage restriction data, pth1, is smaller than both the first and the second passage restriction threshold value, as indicated at step 238, the updated weighting factor, $nw_i$, is assigned the original value of the weighting factor, $w_i$.

In the subroutine for updating road segment weighting factors as illustrated in FIG. 4, the updating rules indicated at steps 235, 237 and 238 ensure that if a road segment is impassable for the particular vehicle, that road segment cannot be included in the planned route. Further, where a road segment can be traversed, but travel through that segment is less favourable because the vehicle passage restriction exceeds the second road segment passage restriction, the determined route will indicate that the driver will need to exercise caution when driving through that road segment.

As described above, FIGS. 3 and 4 illustrate an example of an implementation of a method of determining a route for a vehicle. The method includes providing road segment passage restriction information (pth1) for a plurality of road segments (rd), providing vehicle passage restriction data 121, 135, vp, characterizing the vehicle, and determining a route for the vehicle based upon both the vehicle passage restriction data 121, 135, vp, and the road segment passage restriction information (pth1). Since the determination of the route is based upon both the vehicle passage restriction data 121, 135, vp, and the road segment passage restriction information (pth1), this method takes into account, road segment passage restrictions (pth1) that are relevant only for vehicles having specific characteristics. The term "road segment passage restriction information" (pth1) is intended to refer to information or data associated with a road segment that may be relevant for determining whether a vehicle may pass through a road segment. The term "vehicle passage restriction data" 121, 135, vp, is intended to refer to corresponding data characterizing a vehicle, in which the data are relevant to a determination of whether the vehicle would be able to traverse a road segment. Thus, if several alternate road segments along a route have different road segment passage restrictions (pth1), such as for example, vertical clearance, then it is possible that the optimal route may vary from one vehicle to another. Utilizing this method, routes can thus be determined for various types of vehicles based upon vehicle passage restriction data 121, 135, vp, for a particular vehicle and the road segment passage restriction information (pth1). The route determination is as a result, applicable to the particular vehicle for which the route is determined.

In one implementation, the road segment passage restriction information (pth1) may be a single numerical value that corresponds, for example, to a vertical or horizontal clearance or a weight restriction of the road segment, and this is compared with the corresponding dimensional parameter or weight of the vehicle. However, in a further implementation, first and second passage threshold values may be determined based upon the passage restriction information of a road segment. Subsequently, the route may be determined based upon the vehicle passage restriction data 121, 135, vp, and both first and second passage threshold values. The provision of first and second passage threshold values may in certain implementations add convenience to the method for determining a route by allowing the user to define certain preferences to be taken into account in determining the route. In particular, the first passage threshold value may be set as an absolute limit value for traversal of the road segment, i.e., if the set value is exceeded, it would not be possible for the vehicle to traverse the road segment and the system and method would not permit the determined route to include that road segment. On the other hand, the second passage threshold value may define a safety margin, such that if this second value is exceeded and the first value is not exceeded, passage through the road segment may still be possible, and the road segment may be included in the determined route but with an indication that the driver of the vehicle will need to exercise extra caution when traversing that road segment.

The first and second passage threshold values of a given road segment may be determined in a variety of ways. For example, the road segment passage restriction information (pth1) may explicitly contain both the first and the second passage threshold values, such that these values may be directly read. Alternatively, the road segment passage restriction information (pth1) may contain only the first passage threshold value, whereas the second passage threshold value is computed by subtracting a safety margin, sm, value from the first passage threshold value. The safety margin, sm, may, in turn, be a fixed value or may be determined or entered by a user.

The methods described above may be combined with conventional methods for determining a route. In particular, in many of the conventional methods, a route is determined by computing a cost function based on weighting factors (w) associated with the various road segments, which weighting factors (w) may, e.g., represent a road segment length or a road segment traversal time. In such instances, route determination may be achieved by comparing the vehicle passage restriction data 121, 135, vp, with the passage restriction information of a road segment and, depending upon the result of this comparison, adjusting the weighting factor (w) of the corresponding road segment. In certain implementations, this process will typically be repeated for a plurality of road segments that are potentially relevant to the route being determined and that are stored in the working memory unit 130. The route may then be determined using conventional methods employing the computation of a cost function. Thus, the basic method for determining a route, as described above, may be integrated with certain aspects of existing methods for determining routes.

In certain implementations, the first and second passage threshold values may be determined, the weighting factor of a road segment may be adjusted based upon a comparison of the vehicle passage restriction data 121, 135, vp, and the first passage threshold value and a comparison of the vehicle passage restriction data 121, 135, vp, with the second passage threshold value may be performed. In particular, if the vehicle passage restriction data 121, 135, vp, for example vehicle height, a vehicle width, or a vehicle weight, is smaller than the smaller one of the first and second passage threshold values of the road segment, in one implementation, the weighting factor (w) of the road segment would not be changed, i.e., influenced by the comparison of the road segment passage restriction data (pth1) to the vehicle passage restriction data 121, 135, vp. By contrast, if the vehicle passage restriction data 121, 135, vp, is larger than both the first and second passage threshold value, the weighting factor (w) of the road segment will be increased, typically to a large value such as, for example, infinity. If the vehicle passage restriction data 121, 135, vp, is included within the interval defined by the first and second passage threshold values, the weighting factor (w) of the road segment may also be increased, either additively or multiplicatively, although the increment will typically be less than that where the vehicle passage restriction data 121, 135, vp, is larger than both passage threshold values. In this way, road segments that cannot be traversed by the vehicle are avoided and not included in the determined route, while road segments requiring the driver to use extra caution are made less favourable and may or may not be included in the determined route. The weighting factors (w) of all remaining road segments remain unchanged. In certain implementations, the adjusting of the weighting factors (w) may be based upon user preferences, which allows the user to specify whether roads requiring extra caution are to be avoided in determining the optimal route.

Under some circumstances vehicle passage restriction data may change. This may occur, for example, as a result of a truck being loaded or unloaded or a trailer being coupled to a vehicle. This change in vehicle passage restriction data would require entering the new vehicle passage restriction data and repeating the method of FIGS. 3 and 4.

Figure 5:
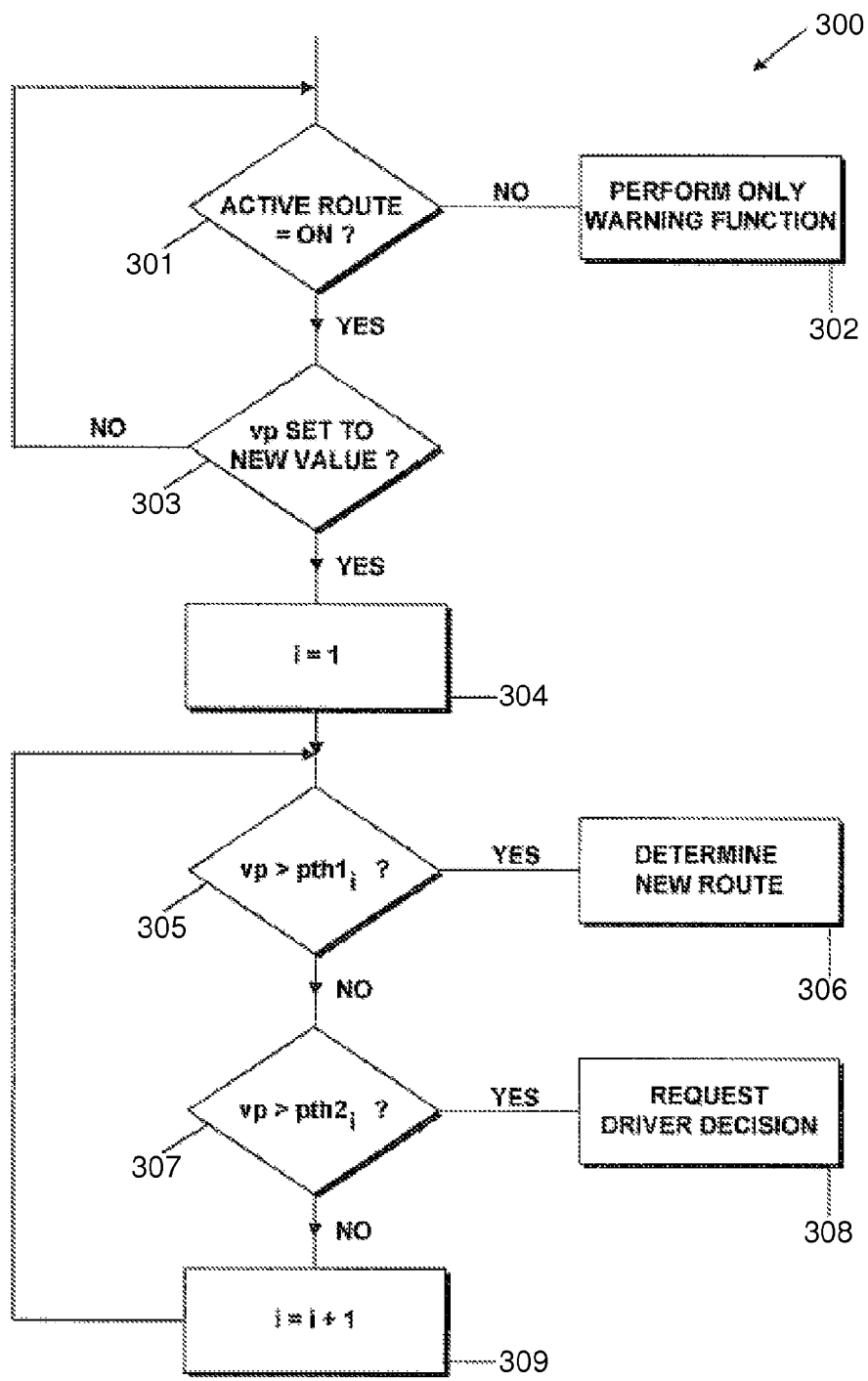
FIG. 5 is a flowchart representing an example of a method for determining a route according to another implementation.

FIG. 5 is a flow chart representing an example of a further implementation of the method illustrated in FIGS. 3 and 4 in which the method has additional features designed to allow for changes in vehicle passage restriction data 121, 135, vp. The method shown in FIG. 5 is generally referenced as method 300. Steps 301, 302 and 303 of the method determine whether there is an active route and whether the vehicle passage restriction data, 121, 135, vp, is to be set to a new value. If there is no active route, only warning functions will be performed as described more fully below. Once the system determines that there is an active route and that the vehicle passage restriction data is set to a new value, an iteration over all remaining road segments of the active route is initiated at steps 304, 305, 306, 307, 308 and 309. For simplicity, the remaining road segments are labelled by numbers represented in the drawing by the letter "i" beginning with "i"=1. At steps 305 and 307, the new value of the vehicle passage restriction data, 121, 135, vp, is compared with the first and second passage threshold values $pth1_i$ and $pth2_i$, respectively, of the road segment. If the vehicle passage restriction data 121, 135, vp, is found to exceed the first road segment passage threshold value, at step 306, the computation of a new route is initiated automatically. If, for one of the road segments, the vehicle passage restriction data 121, 135, vp, is found to exceed the second passage threshold value pth2, at 308, a driver decision is requested as to whether a new route determination is to be initiated. Alternatively, at step 308, a new route determination can be initiated automatically if the driver indicates a preference to avoid road segments in which extra caution is to be exercised. In the method illustrated in FIG. 5, the first and second passage threshold values may be determined as shown in FIGS. 3 and 4 and described above.

The method illustrated in FIG. 5 may be utilized when the vehicle passage restriction data 121, 135, vp is increased such as, for example, an increase in vehicle weight where the vehicle is a truck and the increase is due to vehicle loading. The method may also be readily adapted determine a route when the vehicle passage restriction data 121, 135, vp, is decreased such as, for example, a decrease in weight due to vehicle unloading. In this case, the route originally determined, may still be traversed by the vehicle. However, there may be a better route if the new vehicle passage restriction data 121, 135, vp, is taken into consideration. A better route might be possible because the originally determined route may have excluded certain road segments that could not be traversed when the vehicle had a higher value for the vehicle passage restriction value. In such instances, a new and possibly better route can be determined based upon data from road segment that include those segments that were omitted in the original route determination.

Utilizing the method illustrated in FIG. 5, the vehicle passage restriction data 121, 135, vp, may be easily adjusted at any time. In such instances, the vehicle passage restriction data 121, 135, vp, may be set to a new value while an active route has already been computed and the vehicle may be currently traveling along the route. The method illustrated in FIG. 5 need not repeat the route determination in certain implementations. Instead, once it is determined that the vehicle passage restriction data 121, 135, vp, is set to a new value, this new value may be compared with passage restriction information (pth1) of all remaining road segments of the active route. In certain implementations, only if the new value of the vehicle passage restriction data 121, 135, vp, exceeds, for example, the first passage threshold value of one of the remaining road segments, a new route determination is initiated. In other implementations, as described above, it may be desirable to initiate a new route determination to include in the determination, road segments that were not considered in the original determination due to the original value of the vehicle passage restriction data 121, 135, vp.

Figure 6:
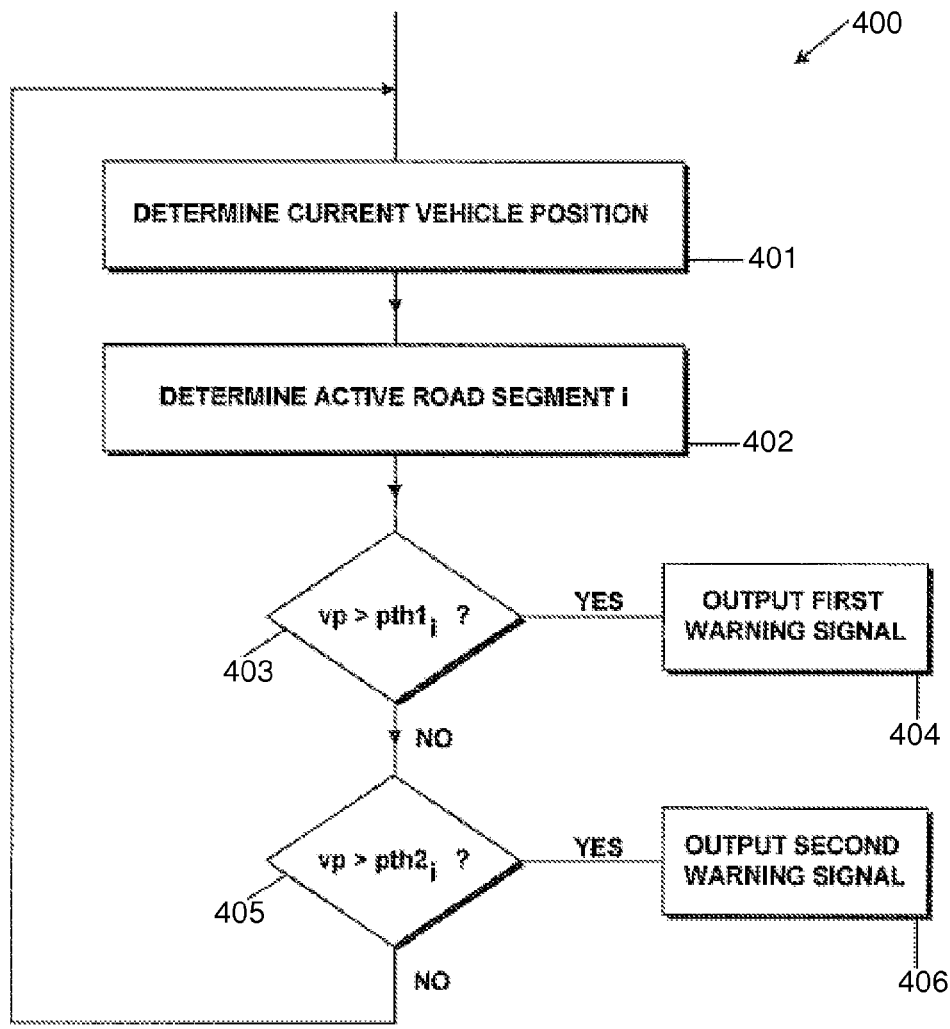
FIG. 6 is a flowchart representing an example of a method for warning a driver of a vehicle according to an implementation.

FIG. 6 is a flow chart representing an example of an implementation of a method that may be utilized in connection with the system of FIG. 1 in providing a warning to a driver of a vehicle. The method may be performed independent of whether a route has been determined. In an example of one implementation as illustrated in FIG. 6 and generally referenced as method 400, a position determining unit 190 of FIG. 1 determines the current vehicle position at step 401. The data is transmitted to the processing unit 140 which, at step 402, determines an active road segment. The active road segment may be the road segment that the vehicle is currently traversing or the road segment the vehicle is approaching. At steps 403 and 405, the vehicle passage restriction data, 121, 135, vp, which has been entered as described above in connection with FIG. 1 and FIGS. 3 and 4 above, is compared with both the first and the second passage threshold value of the active road segment. The first and second passage threshold values are determined in the same way as described above in connection with FIGS. 3 and 4 above. If, at step 403, the vehicle passage restriction data 121, 135, vp, is determined to exceed the first passage threshold value, at step 404, the system outputs a first warning signal. In contrast, if the vehicle passage restriction data 121, 135, vp, is found to be included within the interval defined by the first and the second passage threshold values, at step 406, a second warning signal is output. The second warning signal is typically different from the first warning signal. The first and second warning signal may be any of a variety of warning signals, including optical warning signals, acoustical warning signals or a combination or optical and acoustical signals. The first and second warning signals may be produced by utilizing the output unit 160 or the warning unit 170 of the system illustrated in FIG. 1. In certain implementations, warning signals may be delivered by the output unit 160 of the system such that a separate warning unit 170, as illustrated in FIG. 1, would not necessarily need to be provided.

Although the method illustrated in FIG. 6 generates a warning signal output for a particular road segment, in an alternate method, warning signals may be delivered for a plurality of road segments. For example, if a plurality of road segments may be displayed on a screen 161 of the output unit 160 and steps 403, 404, 405 and 406 indicated in FIG. 6 may be performed for each road segment of the set of road segments displayed on the screen 161. Warning signals may then be included in the output using the same screen 161, for example, as icons or symbols associated with the different road segments, or by using another scheme for coding information. In an example of another scheme for coding information, road segments may be coloured differently, depending upon whether the vehicle passage restriction data 121, 135, vp, exceeds both the first and the second passage threshold value of a respective road segment, whether the vehicle passage restriction data 121, 135, vp, is included within the interval defined by these threshold values, or whether the vehicle passage restriction data 121, 135, vp, is smaller than both of these threshold values. Alternatively, the line thickness of the lines representing road segments on the screen 161 of the output unit 160 may be changed depending upon the vehicle passage restriction data 121, 135, vp, and the corresponding road segment passage restriction information (pth1).

Figure 7:
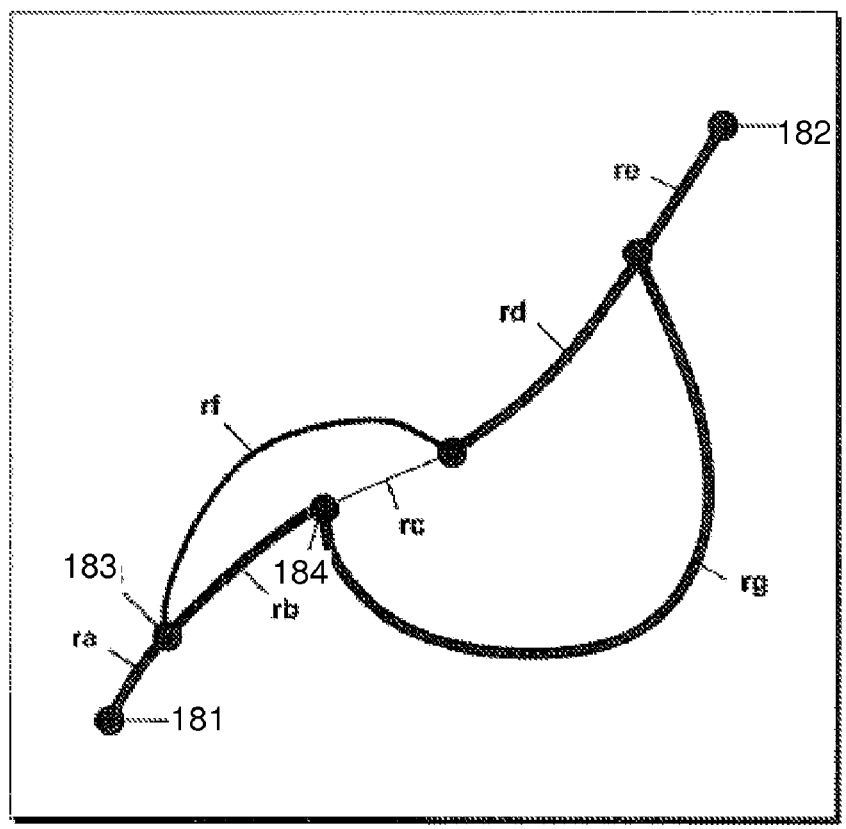
FIG. 7 is a schematic illustration of an example of a set of road segments displayed on an optical output device in which road segment line thickness represents road segment passage restrictions for each of the road segments as compared to vehicle passage restrictions.

FIG. 7 illustrates an example of an implementation of a coding scheme applied to the road network illustrated in FIG. 2. This example represents the situation in which the vehicle has a vertical height that exceeds the vertical clearance of road segment, rc, and that is smaller than the vertical clearance of road segment, rf. The vertical height, however, exceeds the second passage threshold value and it is smaller than the second passage threshold values of all remaining road segments. In this case, the road segments, rc and rf, are indicated by lines that are thinner than all other lines, the line representing road segment, rc, being thinner than the line representing road segment, rf. Various other schemes for encoding passage restriction information may also be used.

It should be noted that, in the methods and systems for warning a driver of a vehicle described with reference to FIGS. 6 and 7 above, warning signals are output depending upon both the vehicle passage restriction data 121, 135, vp, and the road segment passage restriction information (pth1), thus making it possible to output a warning signal to the driver depending upon the parameters specific for the vehicle.

It should further be noted that, while the vehicle passage restriction data 121, 135, vp, and the road segment passage restriction information (pth1) have frequently been exemplified as a vehicle height and a vertical clearance, respectively, the vehicle passage restriction data 121, 135, vp, and road segment passage restriction information are not intended to be restricted to vehicle height and vertical clearance. Instead, both the vehicle passage restriction data 121, 135, vp, and the road segment passage restriction information (pth1) may include several numbers representing different passage restrictions. For example, the vehicle passage restriction data 121, 135, vp, may be a number array including a vehicle height, a vehicle width, a vehicle length and a vehicle weight. The road segment passage restriction information (pth1) for each road segment may also be a number array including a vertical clearance, a lane width, a curvature radius and a weight restriction. In such a case, the methods and systems described above, may be readily adapted to take into consideration two or more different passage restrictions by subsequently performing the steps indicated in FIGS. 4-6 above for each one of the different restrictions that are considered.

While, in the implementations described above, the vehicle passage restriction data 121, 135, vp, is a numerical value that is directly compared with road segment passage restriction information (pth1), the determination of a route or the outputting of a warning signal based on both the vehicle passage restriction data 121, 135, vp, and the road segment passage restriction information (pth1) according to the invention may also involve mathematical operations that are more complex than comparing the vehicle passage restriction data 121, 135, vp, and the road segment passage restriction information (pth1). For example, the vehicle passage restriction data 121, 135, vp, may include a vehicle axle base and a vehicle length, from which a minimum turning circle radius of the vehicle is computed and subsequently compared with a road segment curvature radius. In another example, the vehicle passage restriction data 121, 135, vp, may be a binary value which indicates whether a trailer is coupled to the vehicle or not, a vehicle length and a vehicle turning circle radius being computed based on this binary value and subsequently compared with a road segment curvature radius.

Further, it should be noted, that the vehicle passage restriction data 121, 135, vp, does not necessarily need to be input by a user using the input unit 150 of FIG. 1. Rather, one or several detection mechanism for determining the vehicle passage restriction data may be provided. An example for such detection mechanism is a sensor that automatically determines whether a trailer is coupled to a tow bar of a vehicle, which in turn allows the vehicle length to be determined. The detection unit 180 may also include distance measuring devices for automatically determining a vehicle height or a vehicle length. Further, the detection mechanism does not necessarily need to be provided on the vehicle itself, but can also be external thereto. For example, a scale may be provided for determining the vehicle weight and for automatically transmitting the weight thus determined to the system shown in FIG. 1.

As described above, FIG. 6 exemplifies an implementation of a method for warning a driver of a vehicle. The method includes (i) providing road segment passage restriction information for a road segment, (ii) providing vehicle passage restriction data characterizing the vehicle, (iii) comparing the vehicle passage restriction data with the passage restriction information of the road segment and, depending upon the result of the comparison, (iv) outputting a warning signal. Since the outputting of a warning signal is dependent upon both the vehicle passage restriction data 121, 135, vp, and the road segment passage restriction information (pth1), the warning signal may indicate whether passage through a road segment is allowed for a specific vehicle or not.

The method may further include determining an active road segment on which a vehicle is located or which the vehicle is approaching, a warning signal being output depending on the result of a comparison of the vehicle passage restriction data with the passage restriction information of the active road segment. In this way, the driver receives a warning that is related to the road segment which is currently of most relevance to the driver.

If an optical output device is provided which shows, for example, a portion of a map of a neighbourhood of the current vehicle position, the method for warning a driver may further include the step of determining the set of road segments displayed by the optical output device, and comparing the vehicle passage restriction data with the passage restriction information of each one of the road segments displayed on the output device and outputting a respective warning signal. Such warning signals may include icons displayed on the optical output device, or a color coding indicating whether road segments may be traversed by the vehicle or not or whether extra caution is to be taken. In this way, the driver receives warning signals relating to a plurality of road segments in the neighbourhood of the current vehicle position which allows him, for example, to choose alternative routes.

The warning signal may be selected from a visible warning signal or an audible warning signal. A visible warning signal may include icons displayed on a navigation device screen, or a color coding of road segments displayed on the screen. An audible warning signal may, for example, be a voice output or a sound signal.

While, to determine whether a warning signal is to be output, the vehicle passage restriction data 121, 135, vp, may be compared with a single passage threshold value of the road segment, in certain implementations, a first and second passage threshold value are determined based on the passage restriction information of the road segment (pth1). In certain implementations of a method for warning a driver, the definition and determination of the first and second passage threshold values is the same as in the method for determining a route described above. Thus, the detailed description of the first and second passage threshold values, and the various methods for their determination described above apply also in a method for providing a warning to a driver. In certain implementations, the vehicle passage restriction data may be compared with both the first and the second passage threshold value, and the warning signal may be produced depending upon the results of the comparisons. In particular, if the vehicle passage restriction data 121, 135, vp, is larger than both the first and the second passage threshold value, a first warning signal may be produced. However, if the vehicle passage restriction data 121, 135, vp, is included within the interval between the first and the second passage threshold value, a second warning signal different from the first warning signal may be produced. Moreover, if the vehicle passage restriction data 121, 135, vp, is smaller than either of the first or the second passage threshold value, no warning signal is output at all. In this way, the driver may receive a warning signal indicating whether the vehicle cannot pass the road segment at all, whether extra caution should be exercised as the vehicle traverses the road segment, or whether no extra caution need be taken when travelling along the road segment. In the warning system and method, it is also possible to combine the visual and the audio warning signals for example, when the vehicle restriction data 121, 135, vp, exceeds both threshold values.

In both the method for determining a route and the method for warning a driver as described in any one of the implementations above, the road segment passage restriction information (pth1) may be any one or combination of vertical clearance, horizontal clearance, curvature radius, lane width or weight restriction. However, the passage restriction information (pth1) is not limited to those listed above, but may be any information that indicates that passage through the road segment is impossible for a specific type or types of vehicles. The vehicle passage restriction data 121, 135, vp, may be a vehicle height, a vehicle width, either or both of a vehicle axle base, number of axles, a vehicle length, a vehicle turning circle radius or a vehicle weight. As used herein, the terms vehicle height, width and length typically refer to total dimensions of the vehicle and any objects attached thereto, e.g., roof bike racks, roof luggage racks, rear bike or luggage racks, or similar. Similarly, the term vehicle weight refers to the total weight of the vehicle, passengers and any load, such as cargo. Again, the vehicle passage restriction data 121, 135, vp, is not restricted thereto but may be any data characterizing the vehicle and relevant for passage restrictions.

Further, both in the method for determining a route and in the method for warning a driver, the vehicle passage restriction data 121, 135, vp, may either be input by a user or, alternatively, the data may be automatically determined. The input of vehicle passage restriction data 121, 135, vp, by a user has the advantage of being associated with little technical complexity, while the automatic determination of the vehicle passage restriction data 121, 135, vp, may result in added convenience and accuracy.

The method for warning a driver as described in the implementations above may be easily integrated with the method for determining a route as described in implementations exemplified above. Alternatively, the method for warning a driver may be carried out separately, in particular if there is no active route.

The systems and methods exemplified in the implementations described above, allow the determination of optimum routes based upon vehicle information and road-segment information. For each vehicle, the optimum route to a predetermined destination can thus be calculated.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A method for determining a route from a start point to a destination for a vehicle, the method comprising:
    (a) providing road segment passage restriction information for a plurality of road segments;
    (b) providing vehicle passage restriction data characterizing the vehicle; and
    (c) determining a route from the start point to the destination for the vehicle based upon both the vehicle passage restriction data and the road segment passage restriction information, where determining a route includes determining a first passage threshold value and a second passage threshold value of a road segment based upon the passage restriction information of the road segment, the first and second passage threshold values relating to the same vehicle parameter, and the route is determined based upon the vehicle passage restriction data and each one of the first and second passage threshold values of the road segment.

2. The method of claim 1, where determining a route includes a computation of a cost function based upon road segment weighting factors, the method further including:
    (a) comparing the vehicle passage restriction data with the passage restriction information of a road segment; and
    (b) adjusting the weighting factor of the road segment, depending upon the result of the comparing.

3. The method of claim 2, where adjusting the weighting factor includes adjusting the weighting factor based upon a comparison of the vehicle passage restriction data with each one of the first and second passage threshold values of the road segment.

4. The method of claim 3, where the weighting factor of the road segment is not adjusted if the vehicle passage restriction data is smaller than the smaller one of the first and second passage threshold values of the road segment.

5. The method of claim 4, where the weighting factor of the road segment is increased if the vehicle passage restriction data is larger than the larger one of the first and second passage threshold values of the road segment.

6. The method of claim 1, further including:
    (a) determining whether the vehicle passage restriction data is set to a new value;

(b) comparing the vehicle passage restriction data, if it is set to a new value, with passage restriction information of remaining road segments of an active route; and (c) initiating a new determination of a route, based upon the result of the comparing of the new value of the vehicle passage restriction data.

7. A method of warning a driver of a vehicle, the method comprising:

(a) providing road segment passage restriction information for a road segment;

(b) providing vehicle passage restriction data characterizing the vehicle;

(c) comparing the vehicle passage restriction data with the passage restriction information of the road segment, where comparing includes determining a first passage threshold value and a second passage threshold value based upon the passage restriction information of the road segment; and (d) outputting a warning signal, depending upon the result of the comparing.

8. The method of claim 7, further including determining an active road segment on which the vehicle is located or an active road segment which the vehicle is approaching, where comparing is performed for the active road segment.

9. The method of claim 7, further including determining a set of road segments to be displayed on an optical output device, where the comparing and the outputting are performed for each road segment of the set of road segments.

10. The method of claim 7, where the warning signal is either or both of a visible warning signal and an audible warning signal.

11. The method of claim 7, where the vehicle passage restriction data is compared with each one of the first and second passage threshold values of the road segment, and the warning signal is output depending upon the results of both comparisons.

12. The method of claim 11, where a first warning signal is output if the vehicle passage restriction data is larger than each one of the first and second passage threshold values.

13. The method of claim 12, where a second warning signal different from the first warning signal is output if the vehicle passage restriction data is smaller than the larger one of the first and second passage threshold values and larger than the smaller one of the first and second passage threshold values.

14. The method of claim 7, where the road segment passage restriction information is a vertical clearance, a horizontal clearance, a road segment curvature radius, a lane width, or a weight restriction.

15. The method of claim 7, where the vehicle passage restriction data is a vehicle height, a vehicle width, either or both of a vehicle axle base and number of axles, a vehicle length, a vehicle turning circle radius, or a vehicle weight.

16. The method of claim 7, where providing vehicle passage restriction data includes inputting the vehicle passage restriction data by a user.

17. The method of claim 7, where providing vehicle passage restriction data includes automatically determining the vehicle passage restriction data.

18. A system of route determination for a vehicle, comprising:

(a) a first storage unit containing road segment passage restriction information;

(b) a second storage unit containing vehicle passage restriction data characterizing the vehicle;

(c) a working memory unit for storing a subset of the road segment passage restriction information and the vehicle passage restriction data; and (d) a processing unit coupled to the working memory unit and adapted to determine a route from a start point to a destination based upon both the road segment passage restriction information and the vehicle passage restriction data, and where the processing unit is adapted to determine a first passage threshold value and a second passage threshold value of a road segment based upon the passage restriction information of the road segment, the first and second passage threshold values relating to the same vehicle parameter, and to determine a route from the start point to the destination based upon the vehicle passage restriction data and each one of the first and second passage threshold values of the road segment.

19. The system of claim 18, further including a third storage unit containing road segment weighting factors, where the working memory unit is further adapted to store a subset of the road segment weighting factors, and the processing unit is adapted to adjust the weighting factor of a given road segment stored in the working memory unit based upon the result of a comparison of the vehicle passage restriction data with the passage restriction information of a given road segment.

20. The system of claim 18, further including a detection unit that automatically determines the vehicle passage restriction data and a transfer unit that transfers the vehicle passage restriction data determined by the detection unit to the second storage unit.

21. The system of claim 20, where the detection unit automatically determines whether a trailer is coupled to a tow bar of the vehicle.

22. The system of claim 18, where the system is adapted to perform a method comprising:

(a) providing road segment passage restriction information for a plurality of road segments;

(b) providing vehicle passage restriction data characterizing the vehicle; and (c) determining a route from the start point to the destination for the vehicle based upon both the vehicle passage restriction data and the road segment passage restriction information.

23. A system for warning a driver of a vehicle of a potential problem along a route, the system comprising:

(a) a first storage unit containing road segment passage restriction information;

(b) a second storage unit containing vehicle passage restriction data characterizing the vehicle;

(c) a working memory unit for storing road segment passage restriction information of at least one road segment and the vehicle passage restriction data;

(d) a processing unit coupled to the working memory unit and adapted to compare passage restriction information of the road segment with the vehicle passage restriction data, where the processing unit is adapted to determine a first passage threshold value and a second passage threshold value of the road segment based upon the passage restriction information of the road segment; and (e) an output unit coupled to the processing unit to receive a control signal therefrom and adapted to output a warning signal based upon the control signal.

24. The system of claim 23, further including a position determining unit for determining a current vehicle position where the determining unit is adapted to provide the current vehicle position to the processing unit and where the processing unit is adapted to determine an active road segment on which the vehicle is located or an active road segment which the vehicle is approaching, and to compare the vehicle passage restriction data with the passage restriction information of the active road segment.

25. The system of claim 23, where the processing unit is further adapted to compare the vehicle passage restriction data with each one of the first and second passage threshold values of the road segment and to output the control signal based upon the results of both comparisons, where the output unit is adapted to output a first warning signal or a second warning signal, depending upon the received control signal.

26. The system of claims 23, where the output unit is a screen of a navigation device.

27. The system of 23, where the output unit is an acoustical output device.

28. The system of claim 23, where adapted to perform a method that includes:
    (a) providing road segment passage restriction information for a road segment;
    (b) providing vehicle passage restriction data characterizing the vehicle;
    (c) comparing the vehicle passage restriction data with the passage restriction information of the road segment; and
    (d) outputting a warning signal, depending upon the result of the comparing.

* * * * *